(12) United States Patent
Watkins et al.

(10) Patent No.: US 7,740,821 B2
(45) Date of Patent: Jun. 22, 2010

(54) HIGHLY CONDENSED MESOPOROUS SILICATE COMPOSITIONS AND METHODS

(75) Inventors: James J. Watkins, South Hadley, MA (US); David M. Hess, Belchertown, MA (US)

(73) Assignee: The University of Massachusetts, Boston, MA (US)

( * ) Notice: Subject to any disclaimer, the term of this patent is extended or adjusted under 35 U.S.C. 154(b) by 204 days.

(21) Appl. No.: 12/113,336

(22) Filed: May 1, 2008

(65) Prior Publication Data

US 2009/0324476 A1     Dec. 31, 2009

Related U.S. Application Data

(60) Provisional application No. 60/916,096, filed on May 4, 2007.

(51) Int. Cl.
*C01B 33/20* (2006.01)
(52) U.S. Cl. ........................ 423/326; 423/325
(58) Field of Classification Search ......... 423/700–718, 423/327.1, 326, 325
See application file for complete search history.

(56) References Cited

U.S. PATENT DOCUMENTS

| | | | | |
|---|---|---|---|---|
| 3,058,586 | A * | 10/1962 | Touart | 206/459.5 |
| 3,838,133 | A * | 9/1974 | Hall et al. | 546/64 |
| 4,415,489 | A * | 11/1983 | Kiczek et al. | 510/532 |
| 5,973,096 | A * | 10/1999 | Watabe et al. | 528/15 |
| 6,358,486 | B1 * | 3/2002 | Shan et al. | 423/326 |
| 6,696,258 | B1 * | 2/2004 | Wei et al. | 435/7.2 |
| 7,052,665 | B2 | 5/2006 | Fortier et al. | |
| 7,335,717 | B2 | 2/2008 | Morse et al. | |
| 2003/0157248 | A1 | 8/2003 | Watkins et al. | |
| 2004/0146445 | A1 * | 7/2004 | Morse et al. | 423/335 |
| 2005/0107624 | A1 * | 5/2005 | Lin et al. | 554/174 |
| 2005/0201920 | A1 * | 9/2005 | Shan et al. | 423/335 |
| 2006/0013750 | A1 * | 1/2006 | Martin et al. | 422/241 |
| 2006/0051406 | A1 * | 3/2006 | Parmar | 424/450 |
| 2006/0197058 | A1 * | 9/2006 | Martin | 252/188.1 |

FOREIGN PATENT DOCUMENTS

WO     01/087825 A     11/2001

OTHER PUBLICATIONS

International Searching Authority, International Search Report, PCT/US2008/062150, mailing date: Aug. 27, 2008, 6 pages.
International Searching Authority, Written Opinion, PCT/US2008/062150, mailing date: Aug. 27, 2008, 7 pages.
Naomi Sanabria-DeLong et al., Controlling Hydrogel Properties by Crystallization of Hydrophobic Domains, Macromolecules 2006, 39, 1308-1310.
Avelino Cormo et al., Synthesis of micro- and mesoporous molecular sieves at room temperature and neutral pH catalyzed by functional analogues of silicatein, Chem. Commun., 2006, 3137-3139.
Dongyuan Zhao et al., Nonionic Triblock and star Diblock Copolymer and Oligomeric Surfactant Synthesis of Highly Ordered, Hydrothermally Stable, Mesoporous Silica Structures, J. Am. Chem. Soc., 1998, 120, 6024-6036.
American Chemical Society, J. Am. Chem. Soc. 1998, vol. 120, Zhao Supplemental, 12 pages.
Dongyuan Zhao et al., Triblock Copolymer Synthesis of Mesoporous Silica with Periodic 50 to 300 Angstrom Pores, Science, vol. 279, Jan. 23, 1998, 548-552.
C.T. Kresge et al., Ordered mesoporous molecular sieves synthesized by a liquid-crystal template mechanism, Nature, vol. 359, Oct. 22, 1992, 3 pages.
Kristian Roth et al., Bifunctional Small Molecules Are Biomimetic Catalysts for Silica Synthesis at Neutral pH, J. Am. Chem. Soc. 2005, 127, 325-330.
Eike Brunner et al., Biomimetric synthesis of silica nanospheres depends on the aggregation and phase separation of polyamines in aqueous solution, Phys. Chem. Chem. Phys., 2004, 6, 854-857.
Jennifer Cha et al., Proceedings of the National Academy of Sciences of the United States of America, vol. 96, pp. 361-365, 1999.
K.A. Aamer et al., Biomaterials, vol. 25, pp. 1087-1093, 2004, Abstract, 2 pages.
University of Massachusetts, Office of the Vice Provost for Research, Preparation of Mesoporous Materials with Highly Condensed Network Structures, 2008, 2 pages.
Hess et al., Simple Fabrication of Mesoporous Silica with Remarkable High Temperature Stability at Neutral pH and Ambient Conditions from TEOS, Mar. 2007, Abstract, 1 page.
International Preliminary Report on Patentability; International Application No. PCT/US2008/062150; International Filing Date May 1, 2008; Date of Issuance of Report Nov. 10, 2009 (8 pages).

* cited by examiner

*Primary Examiner*—Timothy C Vanoy
*Assistant Examiner*—Michelle Hou
(74) *Attorney, Agent, or Firm*—Cantor Colburn LLP (57) ABSTRACT

A mesoporous silicate is prepared by a method that includes combining a silicate precursor, a bifunctional catalyst, and a structure-directing surfactant in an aqueous medium having a pH of about 4 to about 10. A mesoporous silicate forms as an aqueous suspension and can then be isolated. The mesoporous silicate can be formed under mild conditions of temperature and pH, and it exhibits a surprisingly high degree of network condensation.

5 Claims, 7 Drawing Sheets

HIGHLY CONDENSED MESOPOROUS SILICATE COMPOSITIONS AND METHODS

CROSS REFERENCE TO RELATED APPLICATION

This application claims the benefit of U.S. Provisional Patent Application Ser. No. 60/916,096 filed May 4, 2007, which is fully incorporated herein by reference.

STATEMENT REGARDING FEDERALLY SPONSORED RESEARCH & DEVELOPMENT

The U.S. Government has certain rights in this invention pursuant to National Science Foundation Center for Hierarchical Manufacturing Grant No. DMI 0531171 and Air Force Office of Strategic Research Grant No. FA9550-06-1-0022.

BACKGROUND OF THE INVENTION

Since their discovery, ordered mesoporous silicates prepared using cooperative assembly techniques have been the subject of considerable research. See, for example, C. L. Kresge et al., *Nature*, volume 359, pages 710-712 (1992); D. F. Zhao et al., *Science*, volume 279, pages 548-552 (1998); and D. H. Zhao et al., *Journal of the American Chemical Society*, volume 120, pages 6024-6036 (1998). While the development of ordered mesoporous silicate particles and films has been underway for some time, their ultimate applications in devices, catalysis and separations has been challenged by issues of thermal and mechanical stability. Specifically, traditional routes to these materials lead to incomplete silicate network formation during the condensation process that produces the inorganic network. For example, in known as-formed (uncalcined) mesoporous silicas, the fraction of silicon atoms bound to four —OSi groups ($Q^4$) is often only about half as great as the combined fractions of silicon atoms bound to two ($Q^2$) and three ($Q^3$) —OSi groups. In other words, the ratio $Q^4/(Q^3+Q^2)$ is often 0.5 or less. Incomplete condensation chemistry in turn leads to significant shrinkage of the film or particles during calcination as well as thermal, mechanical, and hydrothermal instability of the resulting mesoporous silicas under conditions required for many of their intended uses. Furthermore, many of the known methods of producing mesoporous silicas require extremely acidic conditions and/or high temperatures that are incompatible with many molecules and nanoparticles that are candidates for encapsulation in mesoporous silicates.

There is therefore a desire for a method of producing highly condensed mesoporous silicates under mild conditions.

BRIEF DESCRIPTION OF THE INVENTION

The above-described and other drawbacks are alleviated by a method of preparing a mesoporous silicate, comprising: combining a silicate precursor, a bifunctional catalyst, and a structure-directing surfactant in an aqueous medium having a pH of about 4 to about 10 to form an aqueous suspension comprising a mesoporous silicate; and isolating the mesoporous silicate.

Another embodiment is a method of preparing a mesoporous silicate, comprising: combining tetraethylorthosilicate with an aqueous solution at a temperature of about 10 to about 30° C. and allowing the resulting mixture to age for about 0.5 to about 10 days, thereby forming an aqueous suspension of a mesoporous silicate solid; wherein the aqueous solution comprises about 0.01 to about 0.1 mole per liter of cysteamine, about 0.001 to about 0.1 mole per liter of potassium phosphate, about 0.02 to about and 0.2 moles per liter of sodium chloride, and about 0.01 to about 0.1 mole per liter of an alpha-($C_{12}$-$C_{24}$-alkyl)-omega-hydroxy-poly(oxy-1,2-ethanediyl), an alpha-($C_{12}$-$C_{24}$-alkenyl)-omega-hydroxy-poly(oxy-1,2-ethanediyl), or a mixture thereof; and wherein the tetraethylorthosilicate and the aqueous solution are combined in a weight ratio of about 1:4 to about 1:1; separating the mesoporous silicate solid from the aqueous suspension; and washing the separated mesoporous silicate solid.

Another embodiment is a method of forming a silicate-encapsulated species, comprising: combining a silicate precursor, a bifunctional catalyst, a structure-directing surfactant, and an encapsulation candidate in an aqueous medium having a pH of about 4 to about 10 to form an aqueous suspension comprising a silicate-encapsulated species; and isolating the silicate-encapsulated species.

Other embodiments, including silicate-encapsulated species prepared by the above methods, are described in detail below.

DETAILED DESCRIPTION OF THE INVENTION

The present inventors have discovered that unexpectedly highly condensed mesoporous silicates are formed when a silicate precursor is combined with an aqueous solution having a pH of about 4 to about 10 and comprising a bifunctional catalyst and a structure-directing surfactant. The process operates at near-neutral pH, and it can be performed at low temperatures (for example, room temperature). The process is therefore capable of forming highly condensed mesoporous silicate networks under mild conditions and encapsulating acid-sensitive and heat-sensitive species within such networks.

One embodiment is a method of preparing a mesoporous silicate, comprising: combining a silicate precursor, a bifunctional catalyst, and a structure-directing surfactant in an aqueous medium having a pH of about 4 to about 10 to form an aqueous suspension comprising a mesoporous silicate; and isolating the mesoporous silicate. As used herein, the term "mesoporous silicate" refers to a silicate solid comprising pores having a characteristic dimension of about 5 and about 2,500 Angstroms, on average. In some embodiments, the pores have a characteristic dimension of about 10 to about 2,000 Angstroms, specifically about 20 to about 1,000 Angstroms, more specifically about 30 to about 500 Angstroms, still more specifically about 40 to about 250 Angstroms, even more specifically about 50 to about 100 Angstroms. The characteristic dimension of the pores may be determined, for example, by small angle x-ray scattering (SAXS). In this procedure, powder samples are packed into a Kapton™-lined small angle x-ray scattering holder and analyzed by SAXS using a Cu x-ray source. The characteristic center-to-center lattice spacing can then be calculated from the SAXS data.

The silicate precursor used in the method is a compound that is capable of forming a three-dimensional network of Si—O—Si linkages on exposure to water. Suitable precursors include, for example, tetralkoxysilanes (including tetramethylorthosilicate (tetramethoxysilane) and tetraethylorthosilicate (tetraethoxysilane)), hydrocarbyltrialkoxysilanes (including methyltrimethoxysilane and methyltriethoxysilane), dihydrocarbyldialkoxysilanes, silsesquioxanes (including bridged silsesquioxanes and hydrocarbylsilsesquioxanes), and mixtures thereof. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue.

In some embodiments, the silicate precursor is tetraethylorthosilicate. In some embodiments, the silicate precursor is a mixture of tetraethylorthosilicate and methyltriethoxysilane.

The silicate precursor is combined with an aqueous solution comprising a bifunctional catalyst and a structure-directing surfactant. The bifunctional catalyst can have the structure $X^1$—Y—$X^2$, wherein the first functional group $X^1$ is hydroxy (—OH) or mercapto (—SH); the second functional group $X^2$ is primary amino (—$NH_2$), secondary amino (—$NHR^1$ wherein $R^1$ is $C_1$-$C_{12}$ hydrocarbyl), or tertiary amino (—$NR^1R^2$ wherein $R^1$ and $R^2$ are each independently $C_1$-$C_{12}$ hydrocarbyl); and Y is a direct single bond or a divalent $C_2$-$C_{12}$ hydrocarbyl group optionally substituted with one or more ether oxygens. Suitable bifunctional catalysts include, for example, cysteamine, hydroxylamine, hydroxyalkylamines, mercaptoalkylamines, and mixtures thereof. In some embodiments, the bifunctional catalyst is cysteamine.

The structure directing surfactant comprises a hydrophobic fragment such as a long chain alkyl or alkenyl group, and a hydrophilic (and preferably nonionic) fragment such as a long chain poly(alkylene oxy) group. For example, the structure-directing surfactant can be an alpha-($C_{12}$-$C_{24}$-hydrocarbyl)-omega-hydroxy-poly(oxy-1,2-alkanediyl). In some embodiments, the poly(oxy-1,2-alkanediyl) block comprises about 5 to about 40 repeating oxy-1,2-alkanediyl units, specifically about 10 to about 30 repeating oxy-1,2-alkanediyl units. Specific structure-directing surfactants of this type include, for example, alpha-($C_{12}$-$C_{24}$-alkyl)-omega-hydroxy-poly(oxy-1,2-ethanediyl)s, alpha-($C_{12}$-$C_{24}$-alkenyl)-omega-hydroxy-poly(oxy-1,2-ethanediyl)s, alpha-($C_{12}$-$C_{24}$-alkyl)-omega-hydroxy-poly(oxy-1,2-propanediyl)s, and alpha-($C_{12}$-$C_{24}$-alkenyl)-omega-hydroxy-poly(oxy-1,2-propanediyl)s.

In the context of the alpha-($C_{12}$-$C_{24}$-alkenyl)-omega-hydroxy-poly(oxy-1,2-ethanediyl)s, it will be understood that the carbon-carbon double bond in the $C_{12}$-$C_{24}$-alkenyl group can occur anywhere within the $C_{12}$-$C_{24}$-alkenyl chain. In other words, the prefix "alpha" refers to the placement of the entire $C_{12}$-$C_{24}$-alkenyl group, not to the placement of a double bond within the $C_{12}$-$C_{24}$-alkenyl group. In some embodiments, the structure-directing surfactant is an alpha-($C_{14}$-$C_{20}$-alkyl)-omega-hydroxy-poly(oxy-1,2-ethanediyl) (such as Brij 56), alpha-($C_{14}$-$C_{20}$-alkenyl)-omega-hydroxy-poly(oxy-1,2-ethanediyl) (such as Brij 98), or a mixture thereof. Suitable structure-directing surfactants are known in the art as are methods for their preparation. Many structure-directing surfactants are commercially available, including, for example, those sold under the tradenames Brij 35P ($C_{12}H_{25}(CH_2CH_2O)_{30}H$), Brij 56 ($C_{16}H_{33}(CH_2CH_2O)_{10}H$), Brij 58 ($C_{16}H_{33}(CH_2CH_2O)_{20}H$), Brij 76 ($C_{18}H_{37}(CH_2CH_2O)_{10}H$), Brij 78 ($C_{18}H_{37}(CH_2CH_2O)_{20}H$), Brij 96V ($C_{18}H_{35}(CH_2CH_2O)_{10}H$), Brij 97 ($C_{18}H_{35}(CH_2CH_2O)_{10}H$), and Brij 98 ($C_{18}H_{35}(CH_2CH_2O)_{20}H$).

Structure directing agents can also include polylactide-poly(oxy-1,2-alkanediyl) block copolymers (including PLA-PEO diblock copolymers and PLA-PEO-PLA triblock copolymers), hydroxy-diterminated poly(oxy-1,2-ethanediyl)-poly(oxy-1,2-propanedyl) block copolymers (including PEO-PPO diblock copolymers and PEO-PPO-PEO triblock copolymers), amphiphilic phospholipids (including diacylphosphatidylcholines), ($C_{12}$-$C_{24}$-alkyl)-tri($C_1$-$C_6$-alkyl)ammonium halides (such as cetyl trimethylammonium bromide (CTAB)), and mixtures thereof. and mixtures thereof.

When the silicate precursor and the aqueous solution are combined, the concentrations of the bifunctional catalyst and the structure-directing surfactant are typically less than that of the silicate precursor. For example, in some embodiments, the silicate precursor and the bifunctional catalyst are combined in a molar ratio about 3:1 to about 300:1, specifically about 8:1 to about 150:1, more specifically about 15:1 to about 60:1; and the silicate precursor and the structure-directing surfactant are combined in a molar ratio of about 5:1 to about 500:1, specifically about 15:1 to about 200:1, more specifically about 25:1 to about 100:1. Alternatively, the amounts of the bifunctional catalyst and the structure-directing surfactant may be expressed as absolute concentrations. For example, after the silicate precursor and the aqueous medium are combined, the concentration of the bifunctional catalyst can be about 0.004 to about 0.4 mole/liter, specifically about 0.01 to about 0.2 mole/liter, more specifically about 0.02 to about 0.1 mole/liter. Also for example, after the silicate precursor and the aqueous medium are combined, the concentration of the structure-directing surfactant can be about 0.003 to about 0.3 mole/liter, specifically about 0.01 to about 0.2 mole/liter, more specifically about 0.02 to about 0.8 mole/liter. Also for example, after the silicate precursor and the aqueous medium are combined, the initial concentration of the silicate precursor can be about 0.1 to about 4.5 moles/liter, specifically about 0.3 to about 3 mole/liter, more specifically about 0.6 to about 2 mole/liter.

The aqueous medium typically comprises at least 50 weight percent water, specifically at least 70 weight percent water, more specifically at least 80 weight percent water, even more specifically at least 90 weight percent water, still more specifically at least 95 weight percent water.

The aqueous medium has a pH of about 4 to about 10 before it is combined with the silicate precursor. Specifically, the pH can be about 5 to about 9, more specifically about 6 to about 8. Unless otherwise specified, pH values are measured at 23° C. In some embodiments the aqueous medium is unbuffered except for any pH buffering contribution of the bifunctional catalyst and the structure-directing surfactant. In other embodiments, the aqueous medium comprises a pH buffer. The pH buffer typically has at least one $pK_a$ in the range of about 4 to about 10. Suitable pH buffers include, for example, acetate buffers, citrate buffers, 2-(N-morpholino)ethanesulfonic acid (MES) buffers, dimethyl arsenate (cacodylate) buffers, piperazine-N,N'-bis(2-ethanesulfonic acid) (PIPES) buffers, 3-(N-morpholino)propanesulfonic acid (MOPS) buffers, 2-{[tris(hydroxymethyl)methyl]amino}ethanesulfonic acid (TES) buffers, 4-(2-hydroxyethyl)-1-piperazineethanesulfonic acid (HEPES) buffers, N,N-bis(2-hydroxyethyl)glycine (Bicine) buffers, N-tris(hydroxymethyl)methylglycine (Tricine) buffers, 3-{[tris(hydroxymethyl)methyl]amino}propanesulfonic acid (TAPS) buffers, tris(hydroxymethyl)aminomethane (Tris) buffers, phosphate buffers, and mixtures thereof. In some embodiments, the pH buffer is a phosphate buffer, such as a sodium phosphate buffer or a potassium phosphate buffer having a pH of about 6 to about 8. When present, the pH buffer can be used in an amount such that the molar ratio of the silicate precursor and the pH buffer is about 50:1 to about 5,000:1, specifically about 150:1 to about 2,000:1, more specifically about 250:1 to about 1,000:1. Alternatively, the amount of the pH buffer may be expressed in terms of absolute concentration. For example, the concentration of the pH buffer in the mixture resulting from combination of the silicate precursor with the aqueous medium may be about 0.0003 to about 0.03 mole/liter, specifically about 0.001 to about 0.01 mole/liter, more specifically about 0.0015 to about 0.006 mole/liter.

In addition to the bifunctional catalyst, the structure-directing surfactant, and the optional pH buffer, the aqueous medium can, optionally, further comprise an alkali metal halide salt. Suitable alkali metal halides include those in which the alkali metal cation is $Li^+$, $Na^+$, $K^+$, $Rb^+$, $Cs^+$, or $Fr^+$, and the halide anion is $F^-$, $Cl^-$, $Br^-$, $I^-$, or $At^-$. In some embodiments the alkali metal halide is sodium chloride or potassium chloride or a mixture thereof. When present, the alkali metal halide salt is present in a concentration such that the molar ratio of the silicate precursor to the alkali metal halide is about 3:1 to about 300:1, specifically about 10:1 to about 120:1, more specifically about 15:1 to about 60:1. Alternatively, the amount of the alkali metal halide salt may be expressed as an absolute concentration. For example, when the silicate precursor and the aqueous medium are combined, the concentration of the alkali metal halide salt may be about 0.005 to about 0.5 mole/liter, specifically about 0.01 to about 0.2 mole/liter, more specifically about 0.02 to about 0.1 mole/liter.

In some embodiments, the aqueous medium further comprises a $C_1$-$C_{12}$ alkanol. Alkanols can inhibit the rate of mesoporous silicate formation, and they can therefore be used to control the rate of reaction.

One of the advantages of the present method is that it can be conducted at relatively low temperatures compared to prior art processes. For example, in some embodiments, the aqueous solution comprising a mesoporous silicate is formed at a temperature less than or equal to 150° C., specifically less than or equal to 100° C., more specifically less than or equal to 70° C., even more specifically less than or equal to 50° C., still more specifically less than or equal to 40° C., yet more specifically less than or equal to 30° C. Formation of the mesoporous silicate can occur at temperatures at least as low as 10° C. In some embodiments, the aqueous solution comprising a mesoporous silicate is formed at a temperature of about 10 to about 50° C. The temperatures and temperature ranges in this paragraph can refer to the temperature of the mixture resulting from combining the silicate precursor and the aqueous medium, as well as to the temperature at which that mixture is maintained for a period before isolation of the mesoporous silicate.

Another advantage of the invention is that unexpectedly highly condensed silicate networks are formed. One objective measure of the degree of network condensation is the ratio $Q^4/(Q^3+Q^2)$, wherein $Q^4$ represents the fraction of silicon centers bound to four other silicon centers via bridging oxygen atoms, $Q^3$ represents the fraction of silicon centers bound to three other silicon centers via bridging oxygen atoms, and $Q^2$ represents the fraction of silicon centers bound to two other silicon centers via bridging oxygen atoms. See, for example, U.S. Patent Application Publication No. US 2002/0160176 A1 of Pinnavaia et al. This ratio $Q^4/(Q^3+Q^2)$, as determined by $^{29}Si$ NMR for the as-formed mesoporous silicates (that is, mesoporous silicates that have been isolated but not calcined) can be at least 2, specifically at least 3, more specifically at least 5, still more specifically at least 10, even more specifically at least 20, yet more specifically at least 50. In some embodiments, the ratio is about 5 to about 50, specifically about 5 to about 20. Thus, the as-formed mesoporous networks can be nearly fully condensed, without the need for calcining. This result is very surprising given the much lower level of condensation observed when the aqueous solution comprises bifunctional catalyst alone, or structure-directing surfactant alone.

The method comprises isolating the mesoporous silicate from the aqueous suspension in which it is formed. Suitable isolation methods include, for example, filtration and centrifugation. In some embodiments, the isolated mesoporous silicate is washed to remove soluble impurities. Deionized water is a suitable washing agent.

The present method is useful for forming silicate-encapsulated species. Generally, any species having dimensions less than or equal to the pore dimensions of the mesoporous silicate may be encapsulated. Because the present method is capable of producing highly condensed silicate networks under mild conditions of pH and temperature, it is capable of encapsulating species that would be decomposed under the highly acidic and/or high-temperature conditions of prior methods of forming mesoporous silicates. The silicate-encapsulated species can be formed by combining an encapsulation candidate with the silicate precursor, the bifunctional catalyst, and the structure-directing surfactant. As used herein, the term "encapsulation candidate" refers to a species that can be encapsulated within the mesoporous silicate as the mesoporous silicate is formed. As mentioned above, the encapsulation candidate will typically be of a size that fits within the pores of the mesoporous silicate. Suitable encapsulation candidates include, for example, proteins, enzymes, catalysts, sensors, nanoparticles (including hydrophilic and hydrophobic nanoparticles), functionalized particles, and quantum dots.

Another embodiment is a method of forming a silicate-encapsulated species, comprising: combining a silicate precursor, a bifunctional catalyst, a structure-directing surfactant, and an encapsulation candidate in an aqueous medium having a pH of about 4 to about 10 to form an aqueous suspension comprising a silicate-encapsulated species; and isolating the silicate-encapsulated species. The pH of the aqueous medium can be about 4 to about 10, specifically about 5 to about 9, more specifically about 6 to about 8. In some embodiments, the aqueous suspension comprising the silicate-encapsulated species is formed at a temperature of about 10 to about 50° C. Another embodiment is a silicate-encapsulated species prepared by the process, wherein the encapsulation candidate is acid-sensitive and/or heat-sensitive. In this context, the term "acid-sensitive" means that the encapsulation candidate undergoes detectable chemical decomposition when exposed to a 0.1 mole/liter hydrochloric acid aqueous solution at 23° C. for one hour. Also in this context, the term "heat-sensitive" means that the encapsulation candidate undergoes detectable chemical decomposition when exposed to boiling water (that is, liquid water at 100° C. and one atmosphere) for one hour.

There is no particular limitation on the physical form of the mesoporous silicate formed by the method. For example, the mesoporous silicate may be in the form of particles or in the form of a continuous film. In some embodiments, the mesoporous silicate may be formed on a template as described, for example, in U.S. Patent Application Publication No. US 2003/0157248 A1 of Watkins et al.

The method may, optionally, further comprise calcining the isolated mesoporous silicate. For example, calcining may be conducted at a temperature of about 200 to about 1,000° C., specifically about 300 to about 800° C., more specifically about 400 to about 600° C. One advantage of the highly condensed mesoporous silicates formed by the present method is that they exhibit very little shrinkage on calcining. For example, in some embodiments, the mesoporous silicate exhibits a shrinkage less than or equal to 3 percent, specifically less than or equal to 2 percent, more specifically less than or equal to 1 percent, after calcining versus before calcining. The percent shrinkage occurring on calcining can be measured, for example, by conducting small angle x-ray scattering before and after calcination. The resulting SAXS data can be used to calculate d-spacing. The percent shrinkage can be calculated as the percent change in d-spacing.

One embodiment is a method of preparing a mesoporous silicate, comprising: combining tetraethylorthosilicate with an aqueous solution at a temperature of about 10 to about 30° C. and allowing the resulting mixture to age for about 0.5 to about 10 days, specifically about 1 to about 5 days, thereby forming an aqueous suspension of a mesoporous silicate solid; wherein the aqueous solution comprises about 0.01 to about 0.1 mole per liter of cysteamine, about 0.001 to about 0.1 mole per liter of potassium phosphate, about 0.02 to about and 0.2 moles per liter of sodium chloride, and about 0.01 to about 0.1 mole per liter of an alpha-($C_{12}$-$C_{24}$-alkyl)-omega-hydroxy-poly(oxy-1,2-ethanediyl), an alpha-($C_{12}$-$C_{24}$-alkenyl)-omega-hydroxy-poly(oxy-1,2-ethanediyl), or a mixture thereof; and wherein the tetraethylorthosilicate and the aqueous solution are combined in a weight ratio of about 1:4 to about 1:1; separating the mesoporous silicate solid from the aqueous suspension; and washing the separated mesoporous silicate solid. Aging of the mixture can be conducted, for example, at a temperature of about 10 to about 30° C. The aging time can be about 0.5 to about 10 days, specifically about 1 to about 5 days. The tetraethylorthosilicate and the aqueous solution can be combined in a weight ratio of about 1:4 to about 1:1, specifically about 1:3 to about 1:1. The method can, optionally, further comprise calcining the washed mesoporous silicate solid.

The invention is further illustrated by the following non-limiting examples.

Materials

Cysteamine ($NH_2CH_2CH_2SH$) and surfactants Brij 56 ($C_{16}H_{33}(OCH_2CH_2)_{10}OH$) and Brij 98 ($C_{18}H_{35}(OCH_2CH_2)_{200}H$) were obtained from Sigma-Aldrich and used as received. Tetraethylorthosilicate (TEOS) (95%) was purchased from ACROS. A buffer solution comprising 0.01 M potassium phosphate, 0.15 M sodium chloride, and a pH of 7.2±0.2 was obtained as PBS buffer from Beckman Coulter.

Example 1

Cysteamine (0.001 gram) of was dissolved in 100 microliters (μL) of phosphate buffer solution containing 0.01 M potassium phosphate and 0.15 M sodium chloride. In a separate vial, 0.5 gram of Brij 98 surfactant was dissolved in 5 grams of de-ionized water. One hundred (100) μL of each solution were combined in a single vial and vigorously mixed with a vortex mixer. Then, 100 μL of TEOS was added to the solution. The resultant mixture turned white and was mixed vigorously with a vortex mixer. The mixture was allowed to age at room temperature (ca. 24° C.) for approximately three days. The mixture was then centrifuged at about 5000-8000 rotations per minute. The liquid was removed from the centrifuge tube, leaving the solid. The sample was washed three times using de-ionized water as the rinsing agent.

Organic templates were removed by calcinations at varying temperatures. The most common calcination condition was at 400° C. High temperature calcinations were performed at 600° C. and 800° C. All calcinations were performed in the initial presence of water. Therefore the structures exhibit hydrothermal structural stability.

Figure 1:
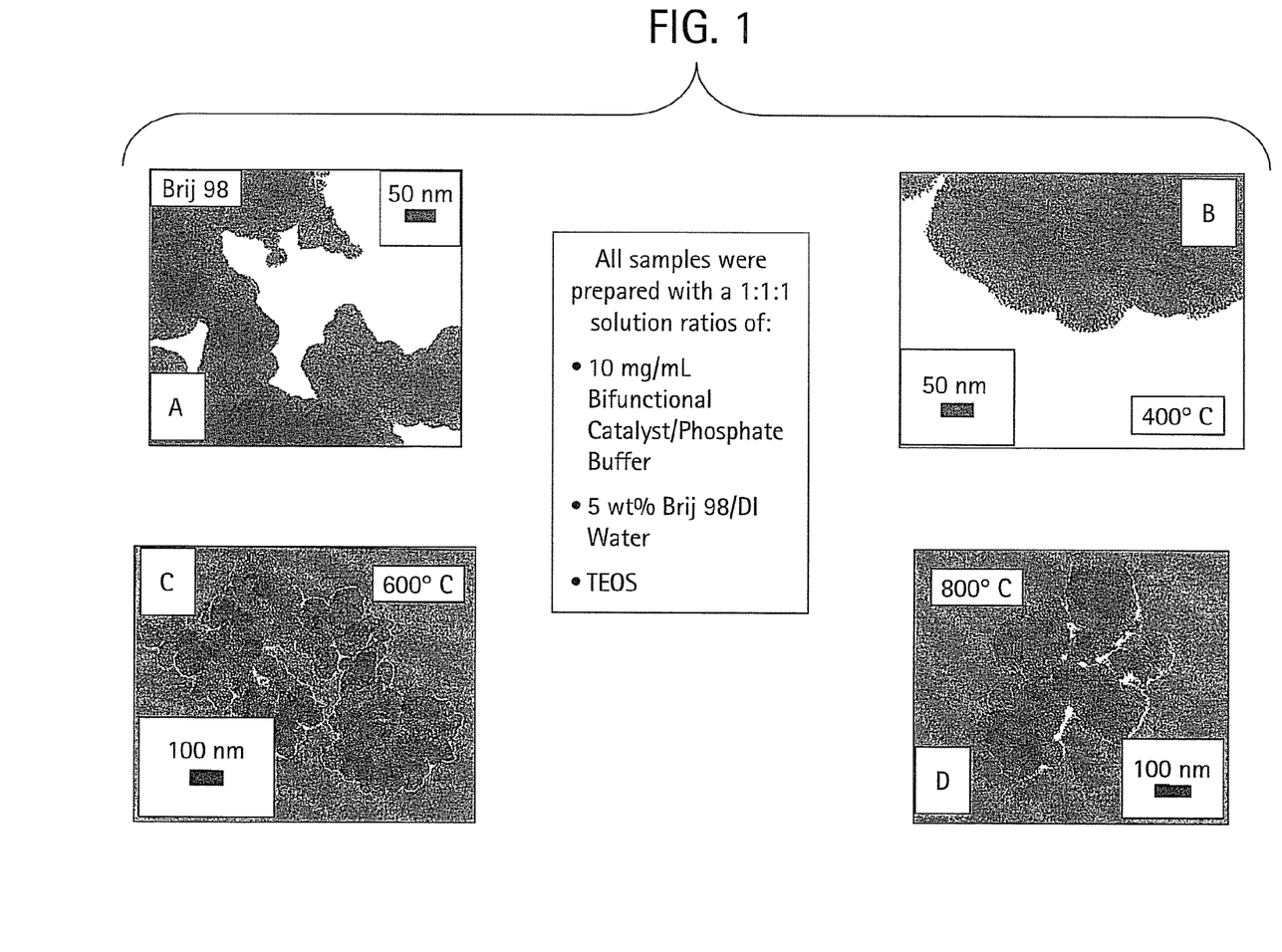
FIG. 1 consists of four transmission electron micrographs of mesoporous silicate particles prepared from a 1:1:1 volume ratio of (1) an aqueous solution of cysteamine (10 mg/mL) and phosphate buffer, (2) an aqueous solution of 5 weight percent Brij 98 surfactant, and (3) tetraethylorthosilicate; image (A) shows the mesoporous silicate nanoparticles as-prepared; images (B)-(D) shows the mesoporous silicate nanoparticles after calcining at 400, 600, and 800° C., respectively.
Figure 2:
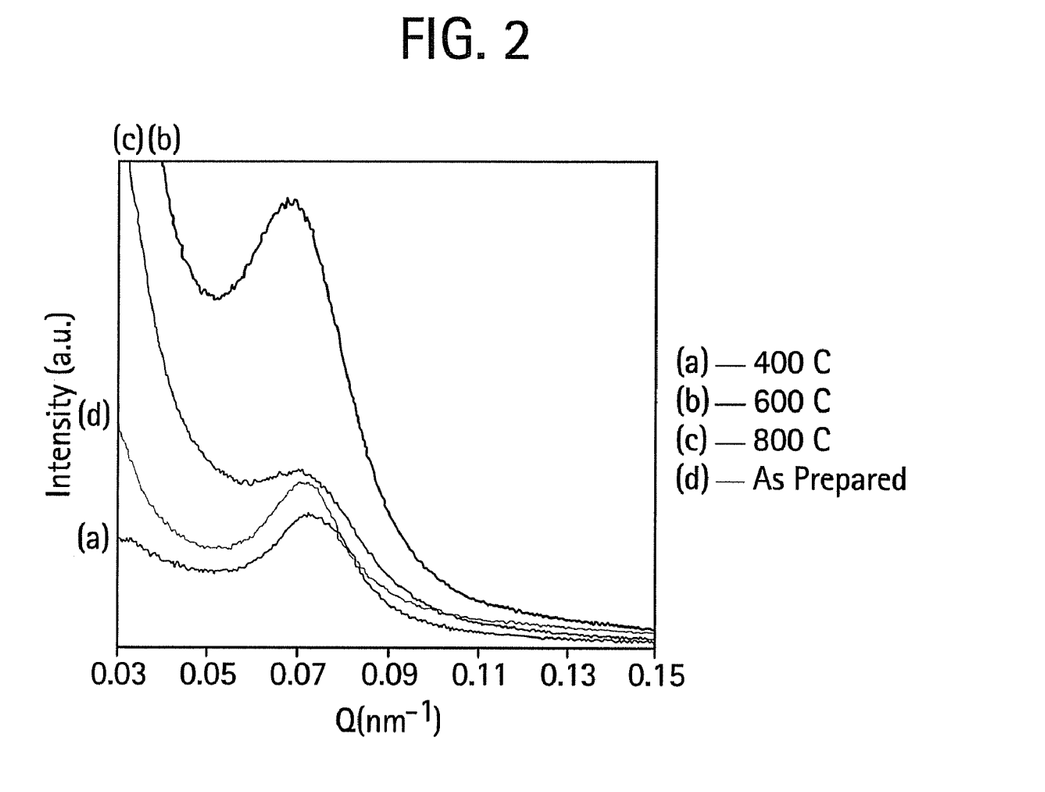
FIG. 2 is a plot of small-angle x-ray scattering (SAXS) data for mesoporous silicate samples prepared by the reaction of TEOS at near neutral pH in the presence of cysteamine and Brij 98 surfactant; the four curves in the plot represent the sample as-prepared and after calcining at 400, 600, and 800° C.
Figure 3:
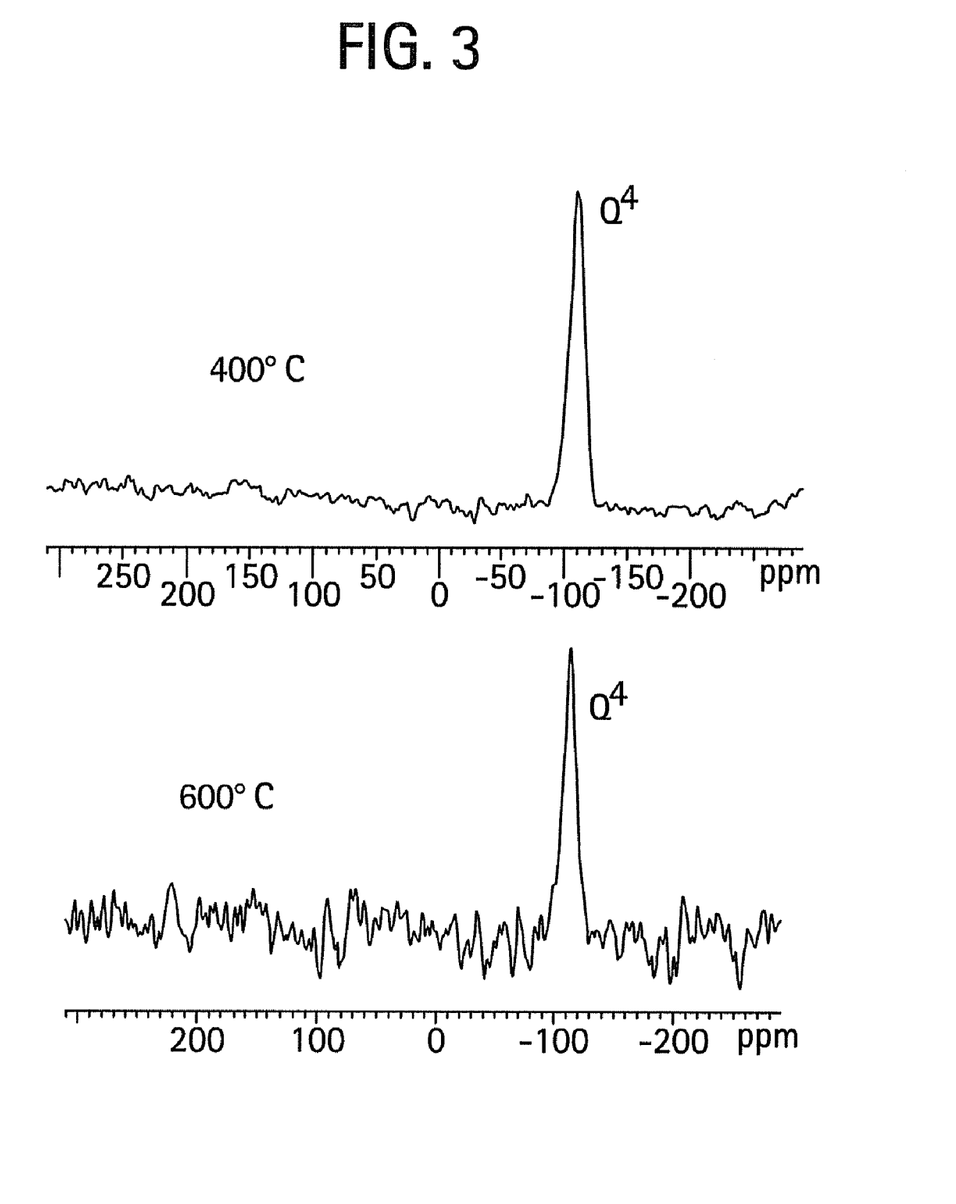
FIG. 3 consists of $^{29}$Si NMR spectra for mesoporous silicates calcined at 400 and 600° C.; the mesoporous silicates were prepared by the reaction of TEOS at near neutral pH in the presence of cysteamine and Brij 98 surfactant.
Figure 4:
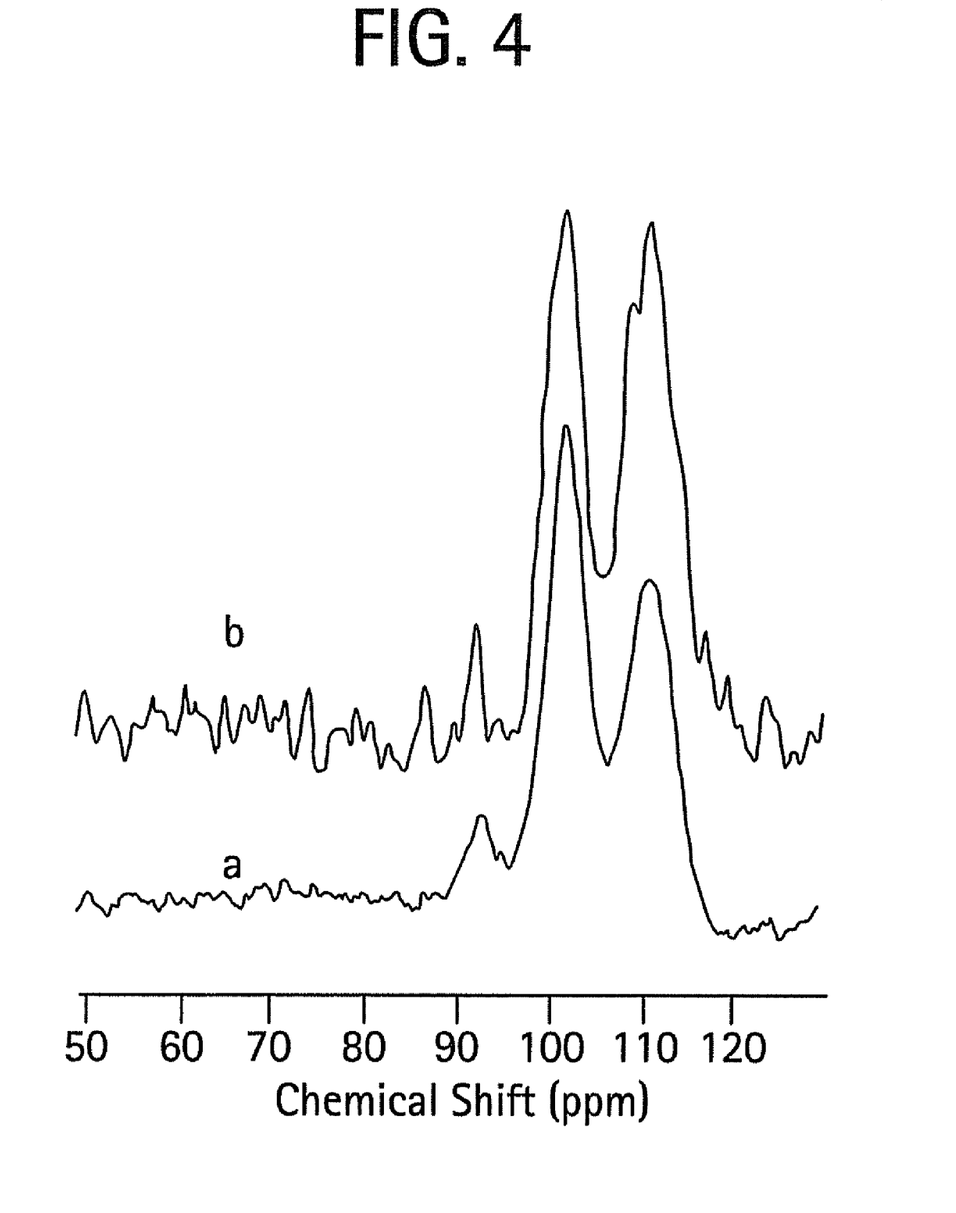
FIG. 4 consists of two comparative $^{29}$Si NMR spectra taken from D. Zhao et al., *Journal of the American Chemical Society*, volume 120, pages 6024-6036 (1998) (supporting information). The spectra correspond to samples designated SBA-11 and SBA-15 in the reference.

FIG. 1 shows a high resolution transmission electron micrograph indicating the selective condensation of silica in a single well-defined domain. Silica is selectively condensed within the hydrophilic poly(ethyleneoxy)-rich phase thus leaving the hydrophobic phase (alkane-rich phase in this case) to form the regular sized pores. Upon calcination at 400° C. and 800° C., there is virtually no contraction in the structure. This is supported by small-angle x-ray scattering (SAXS) data indicating that both the as-prepared sample and the samples calcined at 800° C. have a d-spacing of 8.5 nm (FIG. 2). This incredible thermal stability comes from the unusually high degree of silica condensation that is promoted by the bifunctional catalyst in the presence of the surfactant. $^{29}Si$ NMR (FIG. 3) shows that an as-prepared sample that has been aged overnight exhibits a majority $Q^4$ condensation. After calcination, there is a distinct narrowing of the $Q^4$ NMR peak indicating that there is more ordering at the molecular level. That is to say that the sample is almost completely $Q^4$. These results can be compared to those for mesoporous silicas prepared using conventional catalysts. FIG. 4 shows a published $^{29}Si$ NMR spectrum for mesoporous silica prepared using Brij 56 surfactant with HCl as the catalyst. Previous attempts to replicate a biomimetic structure failed to form such a highly condensed structure. See, for example, J. N. Cha et al., *Proceedings of the National Academy of Sciences of the United States of America*, volume 96, pages 361-365 (1999); and E. L. Brunner, *Physical Chemistry Chemical Physics*, volume 6, pages 854-857 (2004). While not wishing to be bound by any particular mechanism or theory, the present inventors observe that there appears to be a particularly favorable interaction between the bifunctional catalyst, the structure-directing surfactant, and the moderate pH that provides a desirable environment for the complete condensation of silica in high yield. This complete or near-complete condensation provides an explanation for the excellent thermal and hydrothermal stability exhibited by mesoporous silicates prepared by the method.

Example 2

Figure 5:
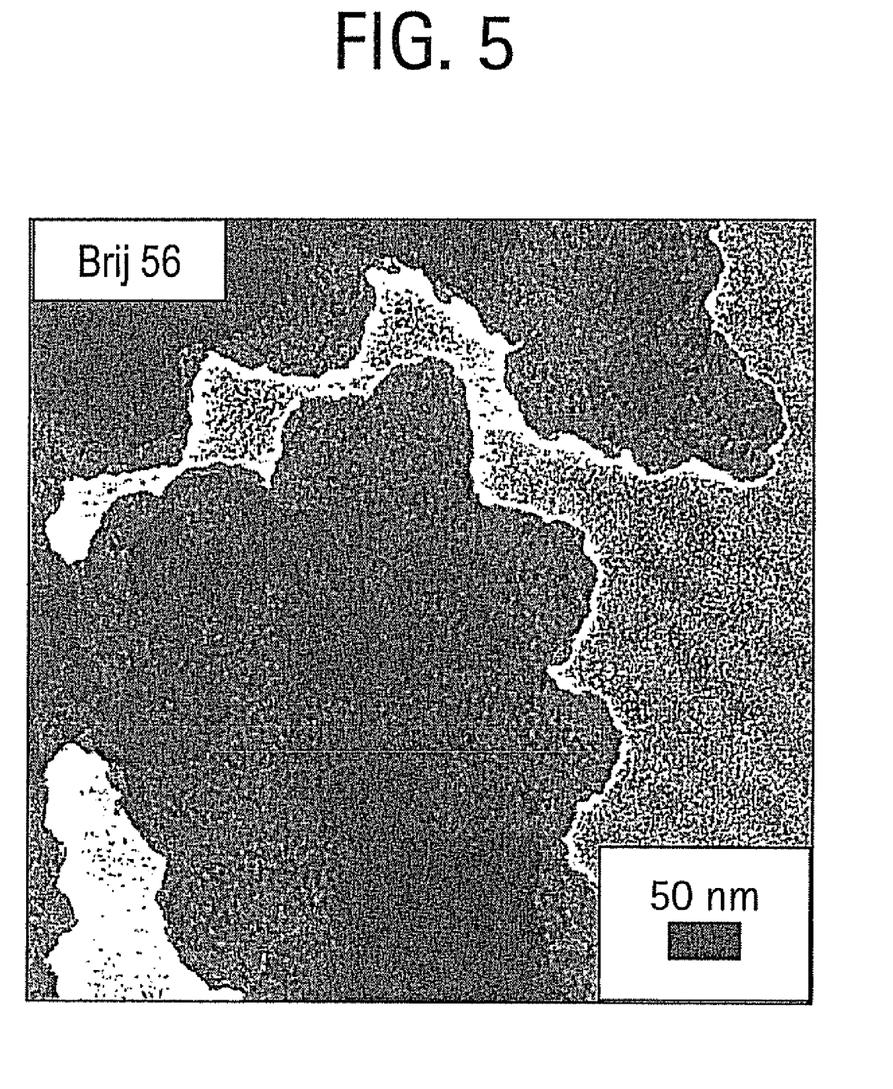
FIG. 5 is a transmission electron micrograph of mesoporous silicate nanoparticles as-prepared by the reaction of TEOS at near neutral pH in the presence of cysteamine and Brij 56 surfactant.
Figure 6:
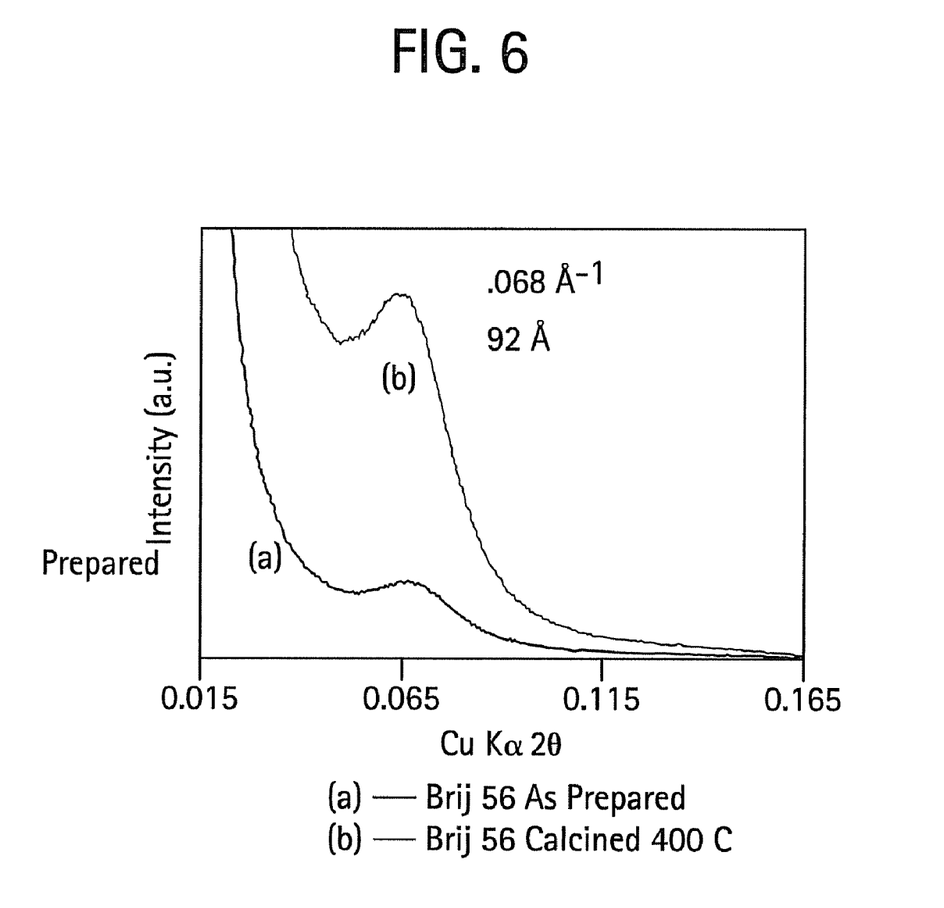
FIG. 6 is a plot of small-angle x-ray scattering (SAXS) data for mesoporous silicate samples prepared by the reaction of TEOS at near neutral pH in the presence of cysteamine and Brij 56 surfactant; the two curves in the plot represent the sample as-prepared and after calcining at 400° C.
Figure 7:
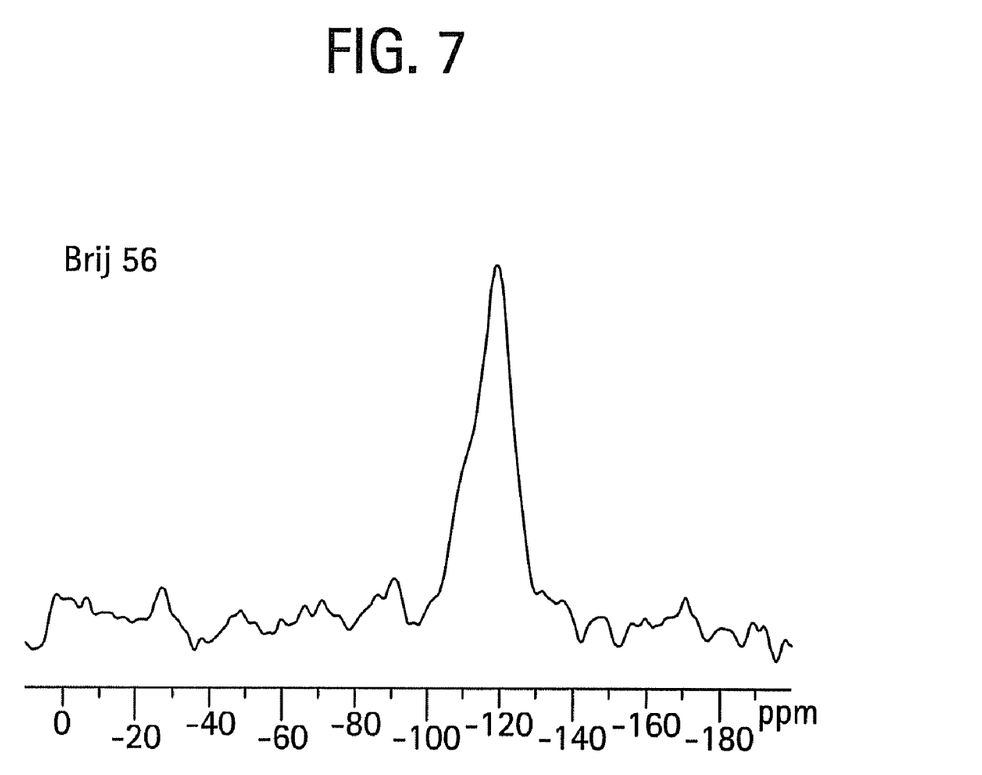
FIG. 7 is a $^{29}$Si NMR spectrum for a mesoporous silicate as-prepared by the reaction of TEOS at near neutral pH in the presence of cysteamine and Brij 56 surfactant.

The procedure of Example 1 was used, except that the structure-directing surfactant was Brij 56 instead of Brij 98. FIG. 5 is a high resolution transmission electron micrograph that shows the selective condensation of silica in a single well-defined domain. Upon calcination at 400° C. there is practically no shrinkage of the silica particle network. FIG. 6 contains SAXS data indicating that there is approximately a 9.2 nm d-spacing for these materials. Again, this thermal stability is believed to derive from the unusually high degree of silica network condensation. There is evidence that this material is virtually all $Q^4$. FIG. 7 shows a $^{29}$Si NMR spectrum indicating the high degree of network condensation within the mesoporous silica/surfactant complex as prepared at room temperature and near neutral pH. This complete condensation directly explains the lack of significant shrinkage of the material.

Example 3

This example illustrates the preparation of a mesoporous silicate using a biodegradable structure-directing surfactant. Solutions of 10 milligrams/milliliter cysteamine in PBS buffer and 5 weight percent PLA-PEO-PLA block copolymer (having a poly(ethylene oxy) midblock number average molecular weight of 8,800 atomic mass units and poly(DL-lactide) endblocks each with a number average molecular weight of 5,040 atomic mass units, prepared according to K. A. Aamer, H. Sardinha, S. R. Bhadia, and G. N. Tew, *Biomaterials*, volume 25, pages 1087-1093 (2004)) in deionized water are prepared at room temperature. The two solutions are then combined in a 1:1 volume ratio. A Teflon™-coated magnetic stir bar is added to the solution. TEOS is then added to form a final volume ratio of 1:1:1. The sample is then agitated at room temperature overnight in an uncovered vessel. The solids in the resulting suspension are then washed with de-ionized water three times and collected by centrifugation. The structure-directing surfactant is then removed via biodegradation by soaking the solids in aqueous media at room temperature to yield a mesoporous solid. A variety of other PLA-PEO-PLA structure directing surfactants may be used. For example, the PLA endblocks may each have a number average molecular weight of 1440 atomic mass units.

Example 4

The example demonstrates the use of a hydroxy-diterminated poly(ethylene oxy)-b-poly(propylene oxy)-b-poly(ethylene oxy) triblock copolymer structure-directing surfactant. Solutions of 10 milligrams/milliliter cysteamine in PBS buffer and 5 weight percent Pluronic™ F108 (hydroxy-diterminated poly(ethylene oxy)-b-poly(propylene oxy)-b-poly (ethylene oxy) triblock copolymer having a molecular weight of about 14,600 atomic mass units) structure-directing surfactant in deionized water are prepared and mixed in a 1:1 volume ratio. TEOS is then added to the solution to form a final volume ratio of 1:1:1. The solution is allowed to age overnight. After 24 hours, the solids in the resulting suspension are washed with de-ionized water three times and collected via centrifugation. A variety of other poly(ethylene oxy)-poly(propylene oxy) block copolymers surfactants, including Pluronic F127, can be substituted for Pluronic F108, and it may be preferred to use a Pluronic surfactant having at least 50 weight percent of poly(ethylene oxy) units.

Example 5

This example illustrates enzyme encapsulation. A solution of 5 milligrams/milliliter acid phosphatase in deionized water is added to a solution of 10 milligrams/milliliter cysteamine in PBS buffer and mixed well. A solution of 5 weight percent Brij 98 block copolymer in deionized water is added and mixed well. The volumetric proportion of this mixture is 1:1:1. The solutions are allowed to equilibrate for 10-15 minutes. TEOS is then added to the samples in equal volume part to the previous components. The sample is then agitated over night in an incubator. This experiment can be performed at room temperature or physiological temperature (37° C.).

Example 6

This experiment illustrates encapsulation of a nanoparticle (quantum dot). Solutions of 10 milligrams/milliliter cysteamine in PBS buffer, 5 weight percent structure-directing surfactant (Brij 56, Brij 98, Pluronic L108, Pluronic L127, or PLA-PEO-PLA) in deionized water, and a nanoparticle (PbS, CdSe, ferritin, or polylysine) in deionized water are prepared. The solutions are combined in a 1:1:1 volumetric ratio. The resulting mixture is mixed by agitation. TEOS is added in equal volume amount (that is, to form a 1:1:1:1 volume mixture) and the resulting mixture is agitated and aged overnight. The resulting solids are then washed with deionized water and collected via centrifugation.

Example 7

This experiment describes evaporation-induced self-assembly of a mesoporous silicate film. Solutions of 10 milligrams/milliliter cysteamine in PBS buffer and 5 weight percent Brij 98 surfactant in deionized water are prepared as previously reported. The solutions were mixed in a 1:1 volume ratio. TEOS is the introduced to the system to provide a final volume ratio of 1:1:1 and the suspension is mixed. Immediately a silicon test wafer is dipped into the reactant mixture and slowly drawn out at a constant rate. The sample is then allowed to dry overnight. The structure-directing surfactant is then removed by calcination.

Example 8

This example describes preparation of a mesoporous silicate film by infusion of a silica precursor into a pre-formed template. A cysteamine-doped Brij 98 surfactant film is prepared by spin-coating a PBS buffer-based solution onto a silicon test wafer. The template is exposed to a solution of silica precursor (such as TEOS) in a suitable liquid solvent (such as ethanol) or supercritical fluid solvent (such as supercritical carbon dioxide). Silica condensation occurs within the preformed template. The template is removed via calcination.

Example 9

This example relates to particle rheology. A 10 milligram/milliliter solution of cysteamine in PBS buffer is added to a solution containing 5 weight percent Brij 98 surfactant in de-ionized water in a volumetric ratio of 1:1. The solution is mixed well and TEOS is added to make a final volume ratio of 1:1:1. The sample is then aged overnight in a closed vial. After sufficient aging, the solids are washed three times with deionized water and collected using centrifugation.

The collected particles can then be suspended in a variety of solvents. The first solvent is deionized water for potential biological applications. By varying particle concentration, the viscosity is analyzed over time and at varying deformation rates. Any shear-thinning or shear-thickening is determined for a wide range of applications ranging from coatings to structure-improving additives.

Samples can also be calcined to determine any effects due to the presence of residual polymer within the system. The presence of polymer can affect the final mechanical performance of such particles in selected solvents.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a mesoporous silicate, comprising:
    combining
        a silicate precursor,
        a bifunctional catalyst, and
        a structure-directing surfactant
    in an aqueous medium having a pH of about 4 to about 10 to form an aqueous suspension comprising a mesoporous silicate; and
    isolating the mesoporous silicate;
    wherein the isolated mesoporous silicate has a degree of network condensation characterized by a value of $Q^4/(Q^3+Q^2)$ of at least 3, wherein $Q^4$ represents the fraction of silicon centers bound to four other silicon centers via bridging oxygen atoms, $Q^3$ represents the fraction of silicon centers bound to three other silicon centers via bridging oxygen atoms, and $Q^2$ represents the fraction of silicon centers bound to two other silicon centers via bridging oxygen atoms.

2. The method of claim 1, wherein the value of $Q^4/(Q^3+Q^2)$ is about 3 to about 50.

3. A method of preparing a mesoporous silicate, comprising:
    combining
        a silicate precursor,
        a bifunctional catalyst, and
        a structure-directing surfactant
    in an aqueous medium having a pH of about 4 to about 10 to form an aqueous suspension comprising a mesoporous silicate; and
    isolating the mesoporous silicate;
    wherein the structure-directing surfactant is an alpha-($C_{12}$-$C_{24}$-hydrocarbyl)-omega-hydroxy-poly(oxy-1,2-alkanediyl).

4. A method of preparing a mesoporous silicate, comprising:
    combining tetraethylorthosilicate with an aqueous solution at a temperature of about 10 to about 30° C. and allowing the resulting mixture to age for about 0.5 to about 10 days, thereby forming an aqueous suspension of a mesoporous silicate solid; wherein the aqueous solution comprises
        about 0.01 to about 0.1 mole per liter of cysteamine,
        about 0.001 to about 0.1 mole per liter of potassium phosphate,
        about 0.02 to about and 0.2 moles per liter of sodium chloride, and
        about 0.01 to about 0.1 mole per liter of an alpha-($C_{12}$-$C_{24}$-alkyl)-omega-hydroxy-poly(oxy-1,2-ethanediyl), an alpha-($C_{12}$-$C_{24}$-alkenyl)-omega-hydroxy-poly(oxy-1,2-ethanediyl), or a mixture thereof; and
    wherein the tetraethylorthosilicate and the aqueous solution are combined in a weight ratio of about 1:4 to about 1:1;
    separating the mesoporous silicate solid from the aqueous suspension; and
    washing the separated mesoporous silicate solid.

5. The method of claim 4, further comprising calcining the washed mesoporous silicate solid.

* * * * *